United States Patent [19]
Morton

[11] Patent Number: 5,938,969
[45] Date of Patent: Aug. 17, 1999

[54] FIRE SUPPRESSANT POWDER

[75] Inventor: David Alexander Vodden Morton, Poole, United Kingdom

[73] Assignee: AEA Technology plc, Didcot, United Kingdom

[21] Appl. No.: 08/984,156

[22] Filed: Dec. 3, 1997

[51] Int. Cl.[6] .................. A62D 1/06; C01B 35/10; C01B 35/06
[52] U.S. Cl. ............ 252/4; 252/7; 252/5; 423/283; 423/292; 423/293; 423/294; 423/419.1; 423/421; 423/422; 423/432
[58] Field of Search ............ 252/7, 4, 5; 423/283, 423/292, 293, 294, 419.1, 421, 422, 432

[56] References Cited

U.S. PATENT DOCUMENTS

| | | |
|---|---|---|
| 3,172,852 | 3/1965 | Lobos ............................ 252/5 |
| 3,202,477 | 8/1965 | Loeffler et al. ................. 23/63 |
| 3,216,795 | 11/1965 | Brown et al. .................. 23/149 |
| 3,653,819 | 4/1972 | Shibata et al. ................. 23/63 |
| 4,734,386 | 3/1988 | Kubota et al. ................. 437/160 |
| 4,822,900 | 4/1989 | Hayden ......................... 549/534 |
| 5,304,397 | 4/1994 | Holzl et al. .................... 427/249 |

*Primary Examiner*—Joseph D. Anthony
*Attorney, Agent, or Firm*—William H. Holt

[57] ABSTRACT

A fire suppressant powder with particle sizes less than 5 $\mu$m is made by a chemical reaction between a gas or vapour of a first material and a vapour or an aerosol of a second material. For example an aerosol of sodium hydroxide droplets may be reacted with carbon dioxide gas to produce sodium bicarbonate powder; or boron halide vapour may be reacted with steam to form boric acid powder. The powder may be used in fire extinguishers either on its own, or combined with other ingredients such as silica and/or alumina, and calcium stearate.

3 Claims, 1 Drawing Sheet

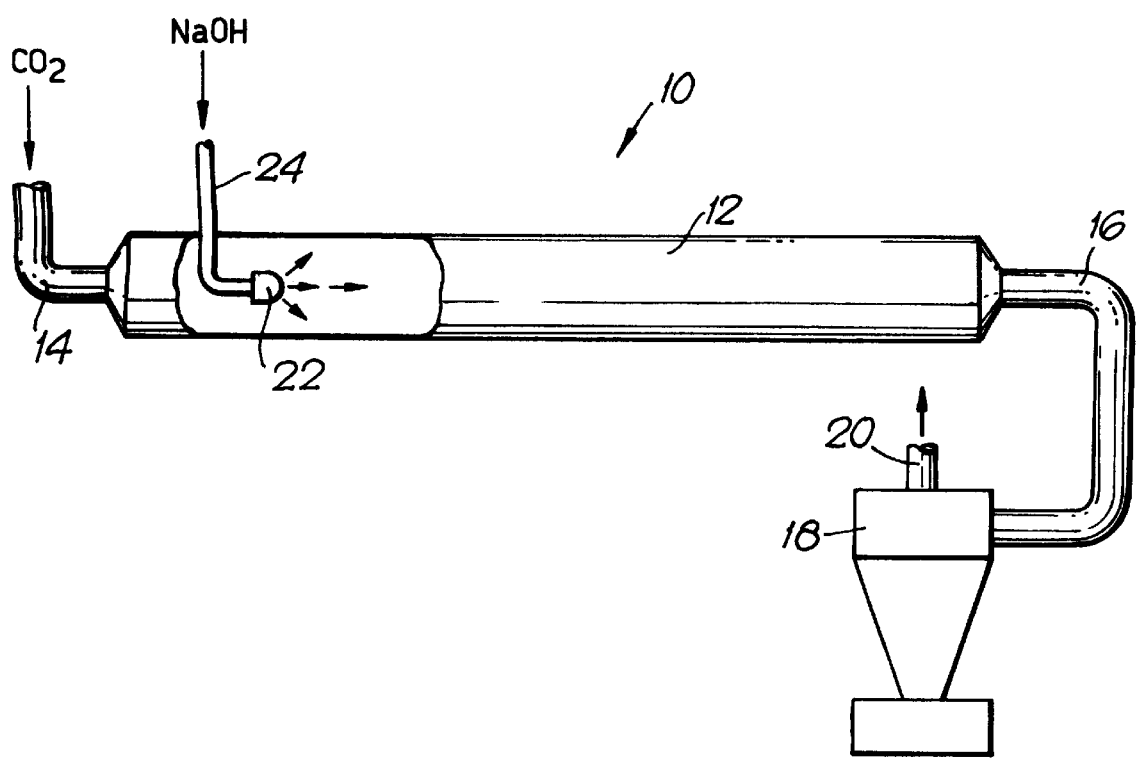

FIRE SUPPRESSANT POWDER

This invention relates to a powder suitable for suppressing or extinguishing fires, and to a method for making such a powder.

BACKGROUND OF THE INVENTION

A wide variety of fire extinguishing powders are known and have been studied for different purposes, for example for preventing ignition in an explosive gas mixture; for extinguishing a propagating flame; or for extinguishing burning material such as sodium metal. For example Bulewicz et al. (Arch. Combust. 1987 7(1–2)) describe the effects of powders of $SiO_2$, $CaCO_3$, $NH_4H_2PO_4$, NaCl, and $NaHCO_3$ of particle sizes 20–40 $\mu$m on flame propagation and on explosion suppression. EP 0 309 881 (Shin-Etsu Handotai) describes use of a silica-based powder for extinguishing sodium and magnesium metal fires, the particles being porous and of size between 5 $\mu$m and 5 mm; for use in fire extinguishers the preferred range is 5 $\mu$m to 200 $\mu$m, while particles smaller than 5 $\mu$m are said to be not suitable. In contrast EP 0 638 335 (Fenwal) teaches the use of a dry powder, based on silica, alumina or titania, and of particle size below 20 $\mu$m, preferably below 5 $\mu$m. The use of pyrotechnically-initiated aerosol-generating formulations has been described by Kilbert et al. (Fire Technology, 1994, p.387), the aerosols having typical particle sizes between 1 $\mu$m and 3 $\mu$m, and Kilbert et al. also present data that indicates that the extinguishing effectiveness significantly increases for particles smaller than a limit size which is different for different materials, typical values lying between about 10 $\mu$m and 40 $\mu$m. It is thus recognised that small particle sizes, say less than 5 $\mu$m, are advantageous for some purposes; but such particles are not easily made.

A. Chattaway et al. (Proc. Halon Options Tech. Working Conf., Albuquerque, 1995) have described a method of making potassium carbonate or bicarbonate by spray drying a solution of the salt, making particles in the size ranges 0.2 to 3 $\mu$m or 0.1 to 5 $\mu$m; and such powders were found to be more efficient fire suppressants than commercially available dry chemical powders. It may be possible to make a fire suppressant by forming an aerosol of droplets of borax ($Na_2B_4O_7.10\ H_2O$) aqueous solution of size less than 5 $\mu$m, and drying to form a powder.

BRIEF SUMMARY OF THE INVENTION

According to the present invention there is provided a method of making a fire suppressant powder of particle size less than 5 $\mu$m, the method involving generating a vapour or an aerosol of a first chemical, and contacting it with a gas or vapour of a second chemical so the first and second chemicals react together to form an aerosol of the fire suppressant material.

By "particle size" in this context is meant the physical diameter of a spherical particle, or the volume equivalent diameter of other shaped particles. The particle size refers to the size of the primary particles; in the resulting powder the primary particles may form weak agglomerates, but these tend to break up due to shear as they are ejected from a fire extinguisher.

For example the method might involve nebulizing an aqueous solution of sodium or potassium hydroxide to generate an aerosol of droplets of size less than about 10 $\mu$m, contacting the aerosol with carbon dioxide gas, and drying the droplets in the aerosol, so as to form an aerosol of dry particles of sodium or potassium carbonate and/or bicarbonate.

In this case the aerosol of the initially-formed fire suppressant material must be dried. The particles in the aerosol are then separated from the gas for example by an impaction, precipitation, or filtration device, for example a cyclone or an electrostatic precipitator. The conditions under which the droplets contact the carbon dioxide gas are desirably such as to enhance the formation of the bicarbonate. This process provides the benefit, compared to the nebulizing of a solution of the carbonate or bicarbonate, that the hydroxides are much more soluble in water, and so the quantity of water which must be removed during drying of the aerosol is considerably reduced.

As an alternative the method might involve contacting boron halide vapour with steam. For example boron trichloride boils at 12.5° C. and boron tribromide boils at 91° C., and each will react with steam to produce boric acid. This process can produce ultrafine particles, for example less than 1 $\mu$m.

The invention also provides a fire suppressant powder with particles of size less than 5 $\mu$m, made by the said method.

BRIEF DESCRIPTION OF THE DRAWING

The invention will now be further and more particularly described by way of example only and with reference to the accompanying drawing which shows diagrammatically an apparatus 10 for making a fire suppressant powder.

DETAILED DESCRIPTION OF THE INVENTION

The apparatus 10 includes a tubular electrically-heated drying oven 12. To one end of the oven 12 an input duct 14 supplies a flow of carbon dioxide gas; the other end of the oven 12 is connected via an outlet duct 16 to a particle separator 18 which in this example is a gas cyclone, from which emerges an outlet flow 20 of carbon dioxide and steam. Near the inlet end of the oven 12 is a nebulizer 22; and a tube 24 supplies a concentrated aqueous solution of sodium hydroxide to the nebulizer 22 so as to form an aerosol with droplets of diameters in the range 1 to 10 $\mu$m. The inner surfaces of the oven 12 are maintained at a temperature above 120° C., for example 150° C., so that all the droplets react chemically with the carbon dioxide to form sodium bicarbonate and then dry out by the time they reach the outlet duct 16.

Thus in operation dry powdered sodium bicarbonate of primary particle sizes typically less than 5 $\mu$m is collected in the separator 18, and is removed at intervals. This powder is very effective as a fire suppressant. It may be used on its own. Alternatively it may be mixed with other powdered materials, so that the sodium bicarbonate powder forms between 90% and 30% by weight of the mixture for example. For example it might be mixed with particles of flame hydrolysed silica alumina or titania, of particle sizes less than 20 $\mu$m and desirably less than 5 $\mu$m. Alternatively it might be mixed with larger particles, which can improve the throwability of the resultant mixture, for example particles of size between 10 and 100 $\mu$m, of silica and/or alumina; such particles may be approximately spherical in shape, and be made by a sol-gel route as described in GB 1 567 003, that is by dispersing silica or alumina powder (made by flame hydrolysis) in a liquid to form a sol, forming droplets of the sol, drying the droplets to form gel spheres and calcining to form porous ceramic particles. To suppress caking of the powders, a hydrophobic agent such as calcium, magnesium, zinc, or aluminium stearate may also be provided at no more than 5% by weight of the mixture.

In a modification, nitrogen gas is caused to flow through the oven 12 (as an inert carrier gas). Boron trichloride liquid is injected via the tube 24 and the nebulizer 22 to form an aerosol of droplets which rapidly evaporate. A short distance downstream of the nebulizer 22 a further inlet tube (not shown) is provided which injects steam into the gas stream. This reacts chemically with the boron trichloride according to the equation:

$$BCl_3 + 3H_2O \rightarrow H_3BO_3 + 3HCl$$

Consequently an ultrafine powder of boric acid is collected in the separator 18, from which it can be removed at intervals. The carrier gas flow along with the hydrochloric acid vapour emerges as the outlet flow 20.

This boric acid powder can be used as a fire suppressant powder in the same way as can the sodium bicarbonate powder. It will be appreciated that boric acid powder can also be made in the manner described, but using boron tribromide as the injected liquid.

I claim:

1. A method of making a fire suppressant powder of particles size less than 5 $\mu$m, the method involving the steps of generating a vapour of a boron halide and contacting it with steam so the boron halide and steam react together to form an aerosol of particles of a boric acid fire suppressant material, and collecting the resultant particles.

2. A method as claimed in claim 1 wherein the halide is trichloride.

3. A method as defined in claim 1 including the further step of combining the particles with ingredients selected from the group consisting of silica, alumina and calcium stearate.

* * * * *